(Model.)
J. MORTON.
Mill Water Regulator.
No. 242,145. Patented May 31, 1881.
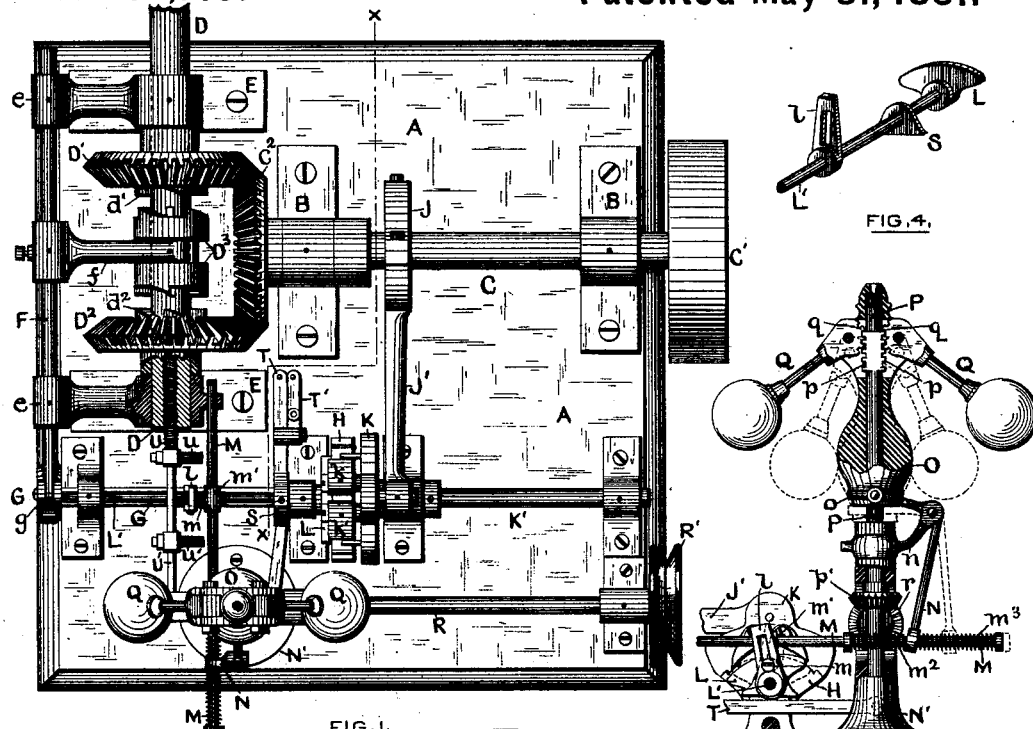
FIG. 1.
FIG. 4.
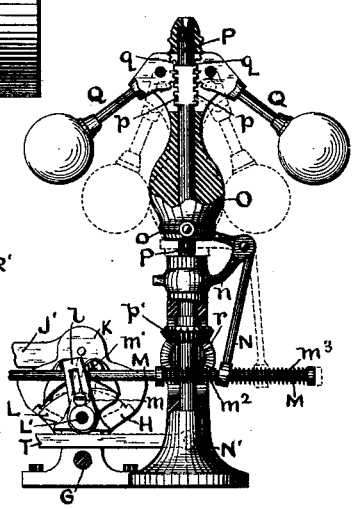
FIG. 8.
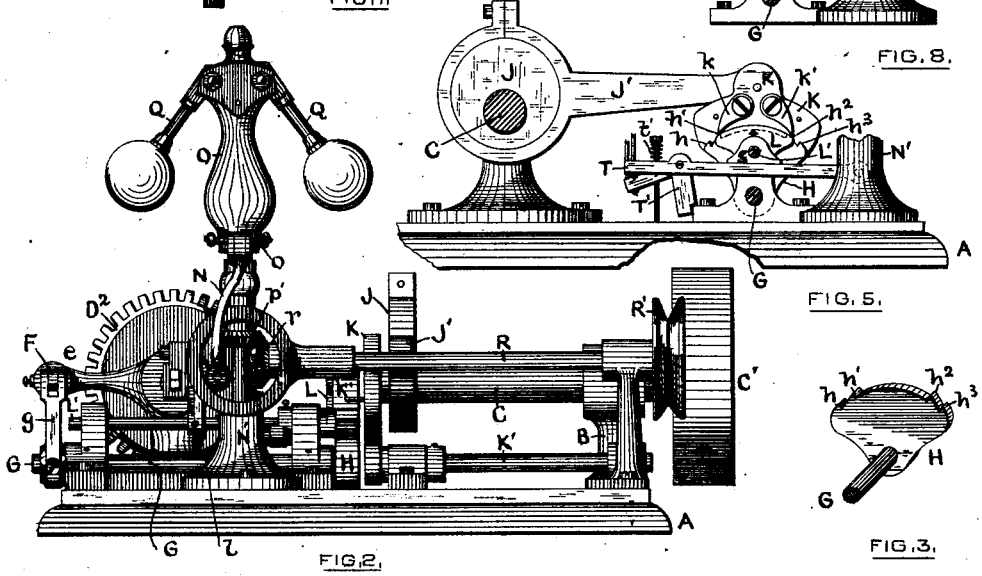
FIG. 2. FIG. 5. FIG. 3.
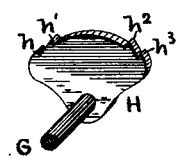
WITNESSES,
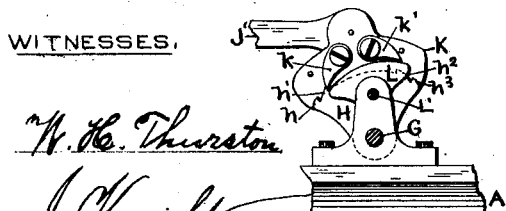
W. H. Thurston
J. Knight
FIG. 6. FIG. 7.
INVENTOR,
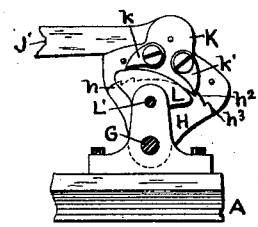
James Morton
N. PETERS, Photo-Lithographer, Washington, D. C.

UNITED STATES PATENT OFFICE.

JAMES MORTON, OF NORWICH, CONNECTICUT.

MILL-WATER REGULATOR.

SPECIFICATION forming part of Letters Patent No. 242,145, dated May 31, 1881.

Application filed February 11, 1881. (Model.)

*To all whom it may concern:*

Be it known that I, JAMES MORTON, of Norwich, in the county of New London and State of Connecticut, have invented a new and useful Improvement in Mill-Water Regulators; and I do hereby declare that the following specification, taken in connection with the accompanying drawings, forming a part of the same, is a full, clear, and exact description thereof.

The object sought by me is a high degree of sensitiveness and prompt action at the gate. To attain these ends I impose upon the governor a minimum of labor, and rely for force requisite to raise and lower the gate upon constantly-driven mechanism wholly independent of the governor, but under the control of the governor when considered with reference to the time of raising or lowering the gate in regulating the speed of the wheel.

For working the gate I employ a constantly-driven shaft carrying a bevel-gear which meshes with two bevel-gears mounted loosely on the gate-shaft, and a sliding splined clutch between these latter causes one or the other to rotatively engage with the shaft and revolve it in the desired direction, or said clutch permits the gate-shaft to remain stationary, said gears meantime revolving. The labor of shifting this clutch to and fro devolves wholly upon a constantly-driven shaft; but the shifting mechanism is under the control of the governor. The promptness of action in raising and lowering the gate is due to the constantly-driven shaft, the gearing, and the clutch, and these elements have heretofore been employed, but they have been so organized with a governor that the constantly-driven shaft was the governor-shaft, and the clutch was directly shifted by the governor. If the governor-shaft be driven by gearing, the backlash therein due to the intermitting and alternate action of the clutch renders the movement of the governor "jerky" and irregular, and if driven by belt, more or less slip or irregular movement occurs under the varying conditions indicated. I also employ a toothed quadrant or ratchet-plate, which is controlled intermittingly and moved alternately in opposite directions by a pair of pawls connected to a constantly vibrating or oscillating plate-lever, which derives its motion from the constantly-driven shaft which works the gate, and said pawls are held out of service or permitted to separately and alternately operate, when required, by means of a segmental plate moved to and fro or permitted to rest by the governor, according to the speed at which the governor is revolved. These pawls and toothed segment, actuated from the constantly-driven shaft, constitute, with a rock-shaft and lever, the clutch-shifting mechanism.

Heretofore double pawls have been controlled by a segmental plate moved to and fro or permitted to rest by the governor, but in all such cases the gear or toothed wheel with which the pawls engaged was so connected with the gate that the latter would be slowly raised or lowered with a "tooth-by-tooth" motion instead of rapidly, as with the clutch and gearing employed by me. Moreover, in all such cases the pawl-lever has been so connected with the governor that the gate-moving labor has been performed through the pawls by the same belt or gearing which directly drove the governor, and therefore the latter was more or less liable to be unfavorably affected in its movements by the constantly-varying labor devolving upon its belt or gearing. In my regulator the pawls merely shift a clutch, and even that slight labor is performed by mechanism which is wholly independent of the governor.

The several features and combinations of devices deemed novel by me are specified in detail in the several claims hereunto annexed.

In the drawings, Figure 1 represents a plan of my improved apparatus. Fig. 2 is an end view of the same. Figs. 3, 4, and 8 represent details of the parts; and Figs. 5, 6, and 7 exhibit portions of the mechanism in different positions, Fig. 5 being a section of Fig. 1 on the line $x\ x$.

A, Fig. 1, is a suitable platform or bed, upon which the whole apparatus is mounted. C is the driving-shaft, carrying a pulley, C', to which power is communicated by a belt from the water-wheel. This shaft is mounted in suitable pillow-block bearings, B B, and at the end opposite the driving-pulley is a bevel-gear, $C^2$, which engages with the teeth of the two bevel-gears D' and $D^2$ mounted loosely on the shaft D. This latter shaft, D, is mounted in suitable journal-bearings in the standards E E, and by appropriate gearing in common use is connected with the water-gate, so that the revolution of said shaft in one direction will tend to close the gate, and in the opposite direction will tend to open the gate, and thereby decrease or increase the flow of water to the water-wheel. Each of the bevel-gears $D'$ $D^2$ is furnished with a clutch-face, and between these two gears, and fitted to slide on the shaft D, is a double-faced clutch-coupling, $D^3$, and which is made to revolve with the shaft by means of a groove-and-spline connection. The clutch $D^3$ is worked to and fro along the shaft D by means of a forked arm or clutch-shipper, $f$, which is secured to a rod, F, arranged to slide longitudinally in suitable bearings in the arms $e$ $e$ projecting from the standards E. The sliding rod F is pivoted at one end to a radius-bar, $g$, keyed to a rock-shaft, G, located in a plane parallel with the driving-shaft C.

A quadrant-plate, H, Fig. 3, having ratchet-teeth $h$ $h'$ $h^2$ $h^3$ upon its periphery, is keyed to the shaft G. This ratchet-faced quadrant-plate, in connection with vibrating pawls, presently to be described, constitutes the means by which the shaft G can be rocked, and consequently the double-faced clutch $D^3$ be brought into connection with one or the other of the clutch-faces $d'$ $d^2$ on the bevel-gears $D'$ $D^2$ respectively, and thereby cause the shaft D to revolve in the one direction or the other, to raise or lower the water-gate.

The driving-shaft C carries an eccentric, J, the strap and rod of which, J', Figs. 1 and 5, cause a plate, K, to be in constant oscillation. This plate K is attached to a rock-shaft, K', set in suitable bearings, Figs. 1 and 2.

Two pawls, $k$ and $k'$, arranged to act in opposite directions, are pivoted to the plate K, and, vibrating with the plate, will, if permitted to do so, engage with the respective ratchets, $h$ $h'$ or $h^2$ $h^3$, Figs. 3 and 5, and thus the power of the water-wheel will be employed to rock the shaft G in the one direction or the other and work the sliding double-faced clutch $D^3$ to raise or lower the gate. The pawls $k$ $k'$ are at all times, except when they are required to assist in changing the amount of the water-flow to the wheel, held out of engagement with the ratchets on the periphery of the quadrant-plate H, Fig. 3, by a segmental plate, L, on which they ride. When, however, this segmental plate, which is mounted on a rock-shaft, L', Fig. 2, is rocked, the ratchet-teeth on the one side or the other of the periphery of the quadrant-plate H will be exposed, and the one or the other of the pawls $k$ $k'$ can engage therewith. Thus, when the water-wheel is running under a constant load resistance at regular speed, the plates H and L are in position relatively to each other, as shown at Fig. 5, and neither pawl can come into engagement with its appropriate ratchet-teeth. If, however, the plate L be tilted to the left, as shown at Fig. 6, the pawl $k$ will be able to engage successively with the teeth $h$ $h'$ and move the plate H to the position shown in the figure; or, if the plate L be tilted to the right, as shown at Fig. 7, the pawl $k'$ will be able to engage successively with the teeth $h^2$ $h^3$, and move the plate H to the position shown in the figure. When the plate H is in the position shown at Fig. 6, if the plate L be tilted toward the right the pawl $k'$ will be able to engage with the tooth $h^3$ on its first stroke and rock the plate H back to the position shown in Fig. 5. When the plate H is in the position shown at Fig. 7, if the plate L be tilted toward the left the pawl $k$ will be able to engage with the tooth $h$ on its first stroke and rock the plate H back to the position shown in Fig. 5.

The only work which the governor, when its balls by centrifugal action change their planes of elevation, is required to do is to rock the plate L, and this duty is entirely within the power of the governor, and does not practically hamper its action to any appreciable degree. Any of the common forms of fly-balls or other governors can be employed to do this required work in many ways which will suggest themselves to constructors of this class of machinery. I prefer, however, to use a governor having the construction particularly shown at Fig. 8.

The shaft L' carries a slotted arm, $l$, Figs. 4 and 8. In this slot is a pin, $m$, which projects from an arm, $m'$, and is adjustable in position thereon. This arm $m'$ is attached to a longitudinally-sliding rod, M, as particularly shown in Figs. 1 and 8. This rod M carries two collars, between which are arranged two springs, $m^2$ and $m^3$, coiled around the rod respectively upon opposite sides of the long arm of a bell-crank lever, N, pivoted to a bracket, $n$, projecting from the supporting-pedestal N' of the governor. The shorter arm of the bell-crank lever N is forked and engages a collar, $o$, loosely mounted on a sleeve, O, capable of sliding vertically upon and revolving with a vertical shaft, P. The upper end of this shaft is provided with racks $p$ $p$, opposite to each other, with which racks the toothed segmental ends $q$ of the governor-ball arms Q engage. These arms Q are pivoted in the slotted upper end of the long sleeve O. The vertical shaft P carries, near its lower end, a bevel-gear, $p'$, which is fixed to said shaft and meshes with another bevel-gear, $r$. This latter gear, $r$, is keyed to the shaft R, driven by the pulley R' with a belt from a pulley on the water-wheel shaft. When the governor-balls change their planes of elevation the rod M is moved longitudinally and the plate L is tilted correspondingly, as clearly indicated at Fig. 8.

The governor above described is substantially as others heretofore employed with steam-engines.

When the wheel is started and stopped it is desirable that the plate L should be in the position shown in Fig. 5. To secure this I employ a locking device consisting of a block, S, having a flat face, Figs. 1, 4, and 5, secured to the shaft L', a pivoted bar, T, passing under said plate, and a spring-latch, T', pivoted to said bar. When the free end of the bar T is raised it will engage the face of the block S and move the plate L into the desired position, when it will be locked by the latch T', as shown in Fig. 5. When the latch is tripped the spring $t'$ will depress the bar T and leave the plate L free to move. The movements of the bar T and latch T' may be secured by wires attached to their ends, as shown at Fig. 5.

The position of the plate L under normal conditions is determined by the action of the governor; but it will be seen that when the said plate is locked in the position shown in Fig. 5 by the engagement of the bar T with the block S the governor will no longer control the plate, since the shaft L' cannot be rocked. The continuous revolution of the balls and consequent movement of the parts composing the governor, however, are not effected by the locking of the plate L, since the employment and arrangement of the springs $m^2 m^3$ allows the long arm of the lever N to move upon the rod M. Consequently the governor will sustain no damage, and there is no necessity for unshipping the belt which drives it while the plate L is locked. Incidentally this illustrates how small a load is placed upon the governor, in performing its function of determining the position of the plate L, when said plate is not locked and therefore free to move, for simply the resistance of the springs $m^2 m^3$ is sufficient to communicate the movements of the arm N to the rod M and thence to the plate L.

To guard against accident, should the governor-belt break, or the governor fail to work from any cause, another arrangement is made for moving the plate L into such a position that the pawls $k\ k'$ will bring the plate K into the position shown in Fig. 5, and thereby stop the revolution of the shaft D. For this purpose the inner end of the shaft D is provided with a female screw, which is engaged by a male screw, U, secured to a shipping-bar, U'. This bar is provided with adjustable arms $u\ u'$, Fig. 1, which are arranged one upon each side of the arm $l$, and in such relation thereto that they will engage said arm if the shaft D moves too far in either direction, and thereby move the plate L into the position shown in Fig. 5. The proper pawl, $k$ or $k'$, will then move the plate K and rock the shaft G, which will disengage the clutch $D^3$ and stop the revolution of the shaft D.

What I claim as my invention, and desire to secure by Letters Patent as an improvement in mill-regulators, is—

1. In a water-mill regulator, the combination, substantially as hereinbefore described, of the following organizations and instrumentalities, viz: a shaft connected by appropriate gearing with the gate, a constantly-driven shaft geared loosely to the gate-shaft, a clutch for rotatively connecting said shafting, clutch-operating mechanism actuated by the constantly-driven shaft, and a governor which controls the clutch-operating mechanism, whereby the gate is promptly moved for regulating and the labor of the governor limited to the control of the clutch-operating mechanism.

2. The combination, with the gate-shaft, its loose gears, its clutch, and the constantly-driven shaft and its gear, the clutch-actuating mechanism consisting of the vibrating pawl-plate and pawls, the ratchet-arm, and its clutch-connections, of the governor, and the pawl-controlling plate vibrated by the governor, substantially as described.

3. The combination, with the pawl-and-ratchet mechanism and a rocking plate for governing the engagement of the pawls with their respective ratchets, of a latch-stop mechanism for holding said plate at pleasure in such a position as to prevent the engagement of said pawls and ratchets, substantially as set forth.

4. The combination of the sliding-rod M, plate L, a latch-stop mechanism for holding the plate at pleasure, the lever N, worked by the governor, and the spring-cushions $m^2\ m^3$, mounted on the sliding rod, whereby the said lever may be vibrated without exposing the governor to derangement when the plate L is blocked by the latch-stop mechanism, substantially as set forth.

JAMES MORTON.

Witnesses:
W. H. THURSTON,
I. KNIGHT.